S. HARTMANN.
BUTTER COLLECTING APPLIANCE FOR CHURNS.
APPLICATION FILED JUNE 8, 1910.
971,041.
Patented Sept. 27, 1910.
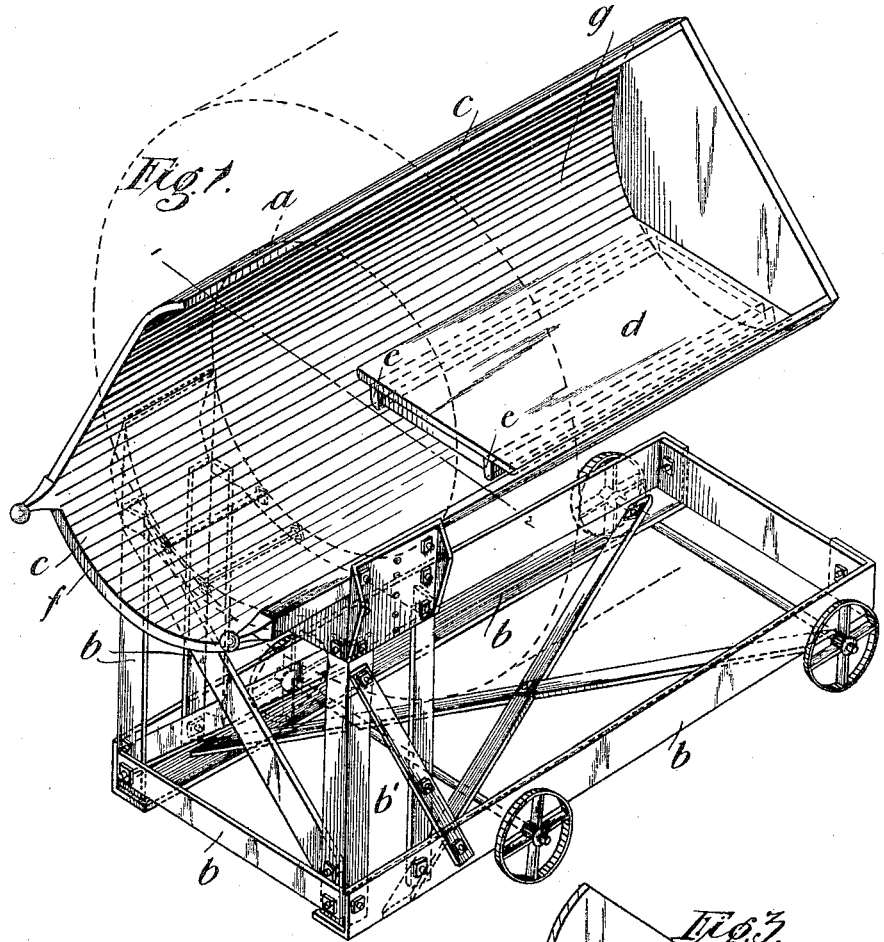
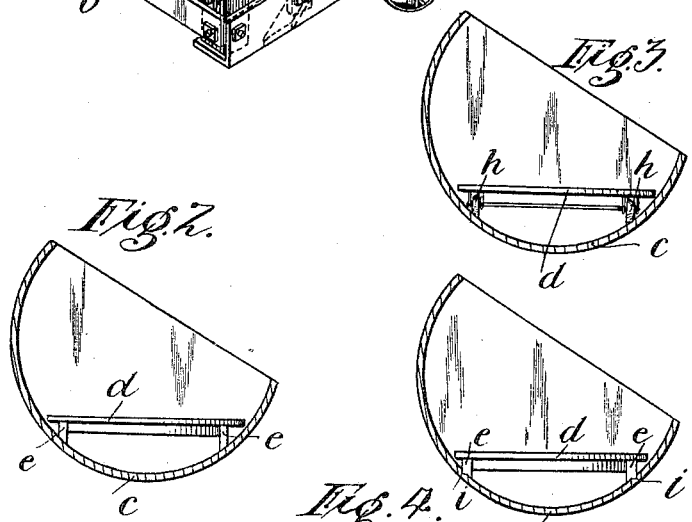
Witnesses:
P. W. Pezzetti
E. Batchelder
Inventor:
Soend Hartmann
by Wright Brown Quinby & May
Attys
THE NORRIS PETERS CO., WASHINGTON, D. C.

UNITED STATES PATENT OFFICE.

SVEND HARTMANN, OF MELBOURNE, VICTORIA, AUSTRALIA.

BUTTER-COLLECTING APPLIANCE FOR CHURNS.

971,041.  Specification of Letters Patent.  Patented Sept. 27, 1910.

Application filed June 8, 1910. Serial No. 565,804.

*To all whom it may concern:*

Be it known that I, SVEND HARTMANN, a citizen of the Commonwealth of Australia, and a subject of the King of Great Britain, residing at "The Rialto," Collins street, Melbourne, in the State of Victoria, Australia, have invented certain new and useful Improvements in Butter - Collecting Appliances for Churns; and I do declare the following to be a full, clear, and exact description of the invention, such as will enable others skilled in the art to which it appertains to make and use the same.

This invention relates to appliances or attachments to be used in connection with rotary churns, for the purpose of collecting and removing the butter therefrom.

The object of the invention is to provide an improved appliance for facilitating the handling of the butter after the working of the same has been performed.

The invention consists in the structure and combination of parts substantially as hereinafter described and claimed.

Of the accompanying drawings:—Figure 1 is a perspective view of a butter collecting appliance constructed in accordance with my invention, the entrance end of a rotary churn of any suitable construction being indicated by dotted lines. Fig. 2 represents a transverse section of the appliance on line 1—2 of Fig. 1. Figs. 3 and 4 are views similar to Fig. 2, but illustrating slight modifications hereinafter described.

Similar reference characters indicate the same or similar parts in all of the views.

The appliance is capable of use in connection with any suitable form of rotary churn, the axis of which is horizontal, such churn having the usual end door. In Fig. 1, the entrance door of such a churn is indicated at $a$ by dotted lines. Churns of the rotary type mentioned usually have, as is well known, a butter working attachment, and also dashers which carry the butter up and then drop it off toward the axis of the churn, after the worker is removed. My invention does not include any such churn and dashers, nor butter worker, and therefore I have omitted illustration thereof in order to avoid confusion. My invention relates solely to the means for collecting the butter and removing it from the churn after the butter has been worked.

The appliance includes a frame $b$ mounted on suitable wheels so that it can be moved about on a floor, said frame having standards $b'$ at one end, the collecting trough $c$ being firmly connected at one end to the upper portions of the standards, said trough projecting rearwardly from the standards, and having a closed rear end. Since there is a clear space between the trough and the frame $b$, the appliance can be run up to a churn and after the butter worker has been removed from the churn, the trough $c$ can be pushed in through the open door so as to receive butter which is elevated by the usual dashers of the churn, the butter sliding off the dashers and dropping into the trough. The trough is preferably a little more than semi-circular in cross sections, and is supported by the standards $b'$, so that one edge is higher than the other. In the operation of the rotary churn, the dashers are always rotated in a given direction when the butter is to be elevated. The mounting of the trough is such that the opening or entrance to it faces toward that side past which the dashers will move when rising. This results in the higher side of the trough catching any butter that is sliding off the dashers.

In case the trough is not large enough to collect all of the butter at one time, the entire trough and the frame $b$ would have to be removed away from the churn, and then returned again to receive more butter. To avoid necessity for removing the trough until the last of the butter has been received therein, or in other words, to increase the removing capacity of the trough without having to shift it, I provide a tray $d$, which is suitably mounted on the continuous bottom of the trough, so that it can travel in the direction of the length thereof. Said tray may be of considerably less length than the trough, but it will receive a large quantity of butter. Usually the tray will occupy a position near the rear portion $g$ of the trough. When the butter is piled thereon, the tray can be drawn forward to the front end $f$ of the trough, and taken out or the butter can be taken therefrom, and then the tray pushed back to catch more butter. Repeated operations of the tray enable all of the butter to be brought to a readily accessible position for removing. Such butter as is not caught upon the tray will fall to the bottom of the trough. Since said bottom is continuous, that butter will remain there until the operation has been finished, and the entire appliance removed from the churn by shifting the frame *b* and drawing the trough out of the mouth of the churn. Of course the preferred material for the trough and the tray will be wood.

Secured to the bottom of the tray *d* I may employ wood strips *e* to slide on the bottom of the trough, as indicated in Figs. 1 and 2. The bottom of the trough may be provided with grooves *i* as shown in Fig. 4, to guide the strips *e*. As shown in Fig. 3, I may provide rollers *h* carried by suitable bearings under the tray and adapted to travel on the continuous bottom of the trough. The tray *d* is preferably flat, and is made of a size to present the maximum area for catching the butter. When the tray is loaded, and has been drawn forward to the front end *f* of the trough, it tends to counterbalance the weight of the rear end of the trough.

I claim:—

1. A butter collecting appliance for rotary churns, comprising a trough having a continuous bottom and provided with a support independent of the churn whereby the trough may be moved into and from the churn, and a tray mounted to travel on the bottom of said trough in the direction of the length thereof.

2. A butter collecting appliance for rotary churns, comprising a trough having a continuous transversely curved bottom, and provided with a support independent of the churn and having a closed rear end and open front end, and a tray mounted to travel on the bottom of said trough in the direction of the length thereof.

3. A butter appliance for rotary churns, comprising a trough having a continuous transversely curved bottom, and provided with a support independent of the churn and having a closed rear end and open front end, and a tray mounted to travel on the bottom of said trough in the direction of the length thereof, one side of the trough being higher than the other.

4. A butter collecting appliance for rotary churns, comprising a trough having a continuous curved bottom, a wheel support for said trough, said support and trough being connected together at one end, and leaving a free space between them rearwardly from the connection, and a tray mounted to travel on the bottom of said trough in the direction of the length thereof.

In testimony whereof I have signed my name to this specification in the presence of two subscribing witnesses.

SVEND HARTMANN.

Witnesses:
ALICE HARKER,
REGINALD ALFRED TURNER.